United States Patent
Hu et al.

(10) Patent No.: US 8,589,909 B2
(45) Date of Patent: Nov. 19, 2013

(54) TECHNIQUES FOR REDUCING DOWN TIME IN UPDATING APPLICATIONS WITH METADATA

(75) Inventors: Wei-Ming Hu, Palo Alto, CA (US); Denny McKinney, Los Altos, CA (US); Marilyn Anne Pratt, Half Moon Bay, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1189 days.

(21) Appl. No.: 11/972,123

(22) Filed: Jan. 10, 2008

(65) Prior Publication Data

US 2009/0183145 A1   Jul. 16, 2009

(51) Int. Cl.
*G06F 9/44* (2006.01)

(52) U.S. Cl.
USPC ........... 717/173; 717/168; 717/169; 717/170; 717/172; 717/174; 717/175; 717/176; 717/177; 717/178

(58) Field of Classification Search
USPC .................................. 717/168–178
See application file for complete search history.

(56) References Cited

U.S. PATENT DOCUMENTS

| | | | |
|---|---|---|---|
| 5,495,610 A | 2/1996 | Shing et al. | |
| 6,006,034 A | 12/1999 | Heath et al. | |
| 6,052,531 A | 4/2000 | Waldin et al. | |
| 6,349,407 B1 | 2/2002 | Towfiq | |
| 6,425,126 B1 | 7/2002 | Branson et al. | |
| 6,438,749 B1 | 8/2002 | Chamberlain | |
| 6,460,055 B1 | 10/2002 | Midgley et al. | |
| 6,526,574 B1 | 2/2003 | Jones | |
| 6,535,894 B1 | 3/2003 | Schmidt et al. | |
| 6,990,660 B2 | 1/2006 | Moshir et al. | |
| 6,996,682 B1* | 2/2006 | Milligan et al. | 711/141 |
| 7,127,712 B1 | 10/2006 | Noble et al. | |
| 7,272,592 B2* | 9/2007 | Wyatt et al. | 1/1 |
| 7,376,945 B1 | 5/2008 | Kakumani et al. | |
| 7,412,700 B2 | 8/2008 | Lari et al. | |
| 7,461,374 B1 | 12/2008 | Ballint et al. | |
| 7,552,431 B2 | 6/2009 | Napier et al. | |
| 7,698,284 B2* | 4/2010 | Becker et al. | 707/999.1 |

(Continued)

OTHER PUBLICATIONS

TDB-ACC-No. NNRD412102, Disclosure Title: "System for Service Level Identification in Client/Server WWW/Java Environment", Research Disclosure, Aug. 1998, UK. 6 pages, retrieved form EAST V 2.0.1.4, Nov. 22, 2004.

(Continued)

*Primary Examiner* — Anna Deng
*Assistant Examiner* — Brahim Bourzik
(74) *Attorney, Agent, or Firm* — Hickman Palermo Truong Becker Bingham Wong LLP (57) ABSTRACT

A method and apparatus for reducing down time in updating applications with metadata is provided. The application contains both code and metadata. A copy of the application is made. A software update is installed on the copy of the application. During installation, the original application continues to run and service users, who may modify the metadata of the original application. Periodically, the metadata of the copy of the application is updated to incorporate changes to the metadata of the original application. When the software update is completed, users are prevented from further modifying the metadata of the original application. The metadata of the copy of the application is updated to incorporate the final changes to the metadata of the original application. Users are redirected from the original application to the copy of the application.

18 Claims, 8 Drawing Sheets

(56) References Cited

U.S. PATENT DOCUMENTS

| | | | |
|---|---|---|---|
| 2002/0174139 | A1 | 11/2002 | Midgley et al. |
| 2003/0050932 | A1 | 3/2003 | Pace et al. |
| 2003/0218628 | A1 | 11/2003 | Deshpande et al. |
| 2004/0015942 | A1 | 1/2004 | Branson et al. |
| 2004/0210653 | A1 | 10/2004 | Kanoor et al. |
| 2006/0048134 | A1 | 3/2006 | Napier et al. |
| 2006/0064685 | A1 | 3/2006 | DeFolo |
| 2006/0136514 | A1 | 6/2006 | Kryloff et al. |
| 2006/0150182 | A1* | 7/2006 | Hughes et al. ............. 717/174 |
| 2006/0294430 | A1 | 12/2006 | Bunker et al. |
| 2007/0006208 | A1 | 1/2007 | Nguyen et al. |
| 2007/0006209 | A1 | 1/2007 | Nguyen et al. |
| 2007/0038991 | A1 | 2/2007 | Schuft et al. |
| 2007/0118626 | A1 | 5/2007 | Langen |
| 2007/0240150 | A1 | 10/2007 | Gangwar et al. |
| 2007/0244999 | A1 | 10/2007 | Hamanaka et al. |
| 2008/0077634 | A1* | 3/2008 | Quakenbush ............. 707/204 |
| 2009/0157811 | A1* | 6/2009 | Bailor et al. ............. 709/204 |
| 2009/0187899 | A1 | 7/2009 | Mani et al. |
| 2010/0162226 | A1 | 6/2010 | Borissov et al. |
| 2011/0138374 | A1 | 6/2011 | Pal |

OTHER PUBLICATIONS

Pugh, William; "Compressing Java Class Files", pp. 247-258, 1999 ACM database, Jan. 13, 2005.

"Updating a JAR File", 3 pages, retrieved from <URL http://java.sun.com/docs/books/tutorial/jar/basics/update.html>, retrieved Jan. 13, 2005.

Retrologic Systems RetroGuard Java Obfuscation:, retrieved from google.com search , <URL http://www.retrologic.com/rg-docspatchadv.html>, Jan. 13, 2005.

Phnguyen et al, Opatch Users Guide, Oracle Corporation, 2003. 10 pages.

Zampiceni, Michael Oracle Universal Installer and Opatch User's Guide, Apr. 2009.

Weidenfeller, T., "Java—Make and execute .jar-file, forum post velocityreviews.com," Apr. 20, 2005, 3 pages.

Sivakumar Seshadri, Oracle Universal Installer and Opatch User's Guide, Jun. 2005, 168 pages.

Trottier, Alain Sun Java 2 Enterprise edition (J2EE) Web component developer exam: exam 310-080, Que Publishing, Nov. 2002, 508 pages, 3 pages.

Brydon, Sean et al., Packaging Utility Classes or Library JAR Files in a Portable J2EE Application, Mar. 1, 2005, 6 pages.

Albercht, Matt "Grobo-Rezip: GroboCoverage Ant Tasks", GroboUtils Project, http://web.archive.org/web/20050209073452/http://groboutils.sourceforge.net/code coverage/v2_antdoc_grobo-rezip.html; Feb. 9, 2005; 3 pages.

U.S. Appl. No. 12/634,518, filed Dec. 9, 2009, Office Action, Jul. 11, 2012.

U.S. Appl. No. 11/173,838, filed Jun. 30, 2005.
U.S. Appl. No. 11/174,069, filed Jun. 30, 2005.
U.S. Appl. No. 10/073,669, filed Feb. 11, 2002.

* cited by examiner

TECHNIQUES FOR REDUCING DOWN TIME IN UPDATING APPLICATIONS WITH METADATA

FIELD OF THE INVENTION

The present invention relates to software applications and, in particular, to efficiently updating software applications that contain metadata.

BACKGROUND

Software applications are often updated through installation of a software update, also known as a "patch". For many applications, the installation of a patch takes only a few minutes. Therefore, one common way to update an application is to shut down the application to make it inaccessible to a user or users, install the patch, and then restart the updated, or patched, application to make it accessible to users again.

However, for some large and complex applications, the installation of a patch is a long and drawn-out process that may take many hours or even many days. For this type of application, shutting down the application in order to install a patch may result in the application being inaccessible to users for an unacceptably long period of time. Therefore, one solution is to make a copy of the application, install the patch to the copy of the application while the original application continues to service users, and then upon the completion of the patch installation to the copy of the application, commence the servicing of users by the patched copy of the application before shutting down the original application. This solution allows a patch to be installed without disrupting the accessibility of users to the application.

This solution, however, is inadequate for applications that contain metadata. Metadata is not part of the application code itself, nor is it part of the data that the application processes in its normal operation. Rather, metadata is data that controls and alters the behavior of the code in an application. Metadata can be included as part of an application, and is typically stored in a repository (either a database or file system) that is shared by all modules of the application. Because the application depends on metadata for correct operation, a patch to the application may contain metadata. Finally, users utilizing an application may also be modifying the metadata contained in the application as user customizations. Examples of user-customizations that modify the metadata of an application include: user interface elements, custom rule definitions, and definitions of reports to run. Because users may continue to make customizations as part of their utilization of the application, a simple solution involving only the patching of a copy of the application, such as the one just described, does not successfully carry over user customizations to the patched application.

The existence of metadata increases the difficulty of patching an application without downtime because each version of the application is typically built with its own version of metadata. Thus, installation of new metadata usually causes an older version of the application to fail or work incorrectly. Application developers can work around this problem by modifying the new metadata to be compatible with the old version of the application. However, this incurs significant cost in human time and effort, and may not be feasible in all cases.

Therefore, it is desirable to develop techniques for patching applications that contain user-modifiable metadata in an efficient manner and with minimal reduced utility for the user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
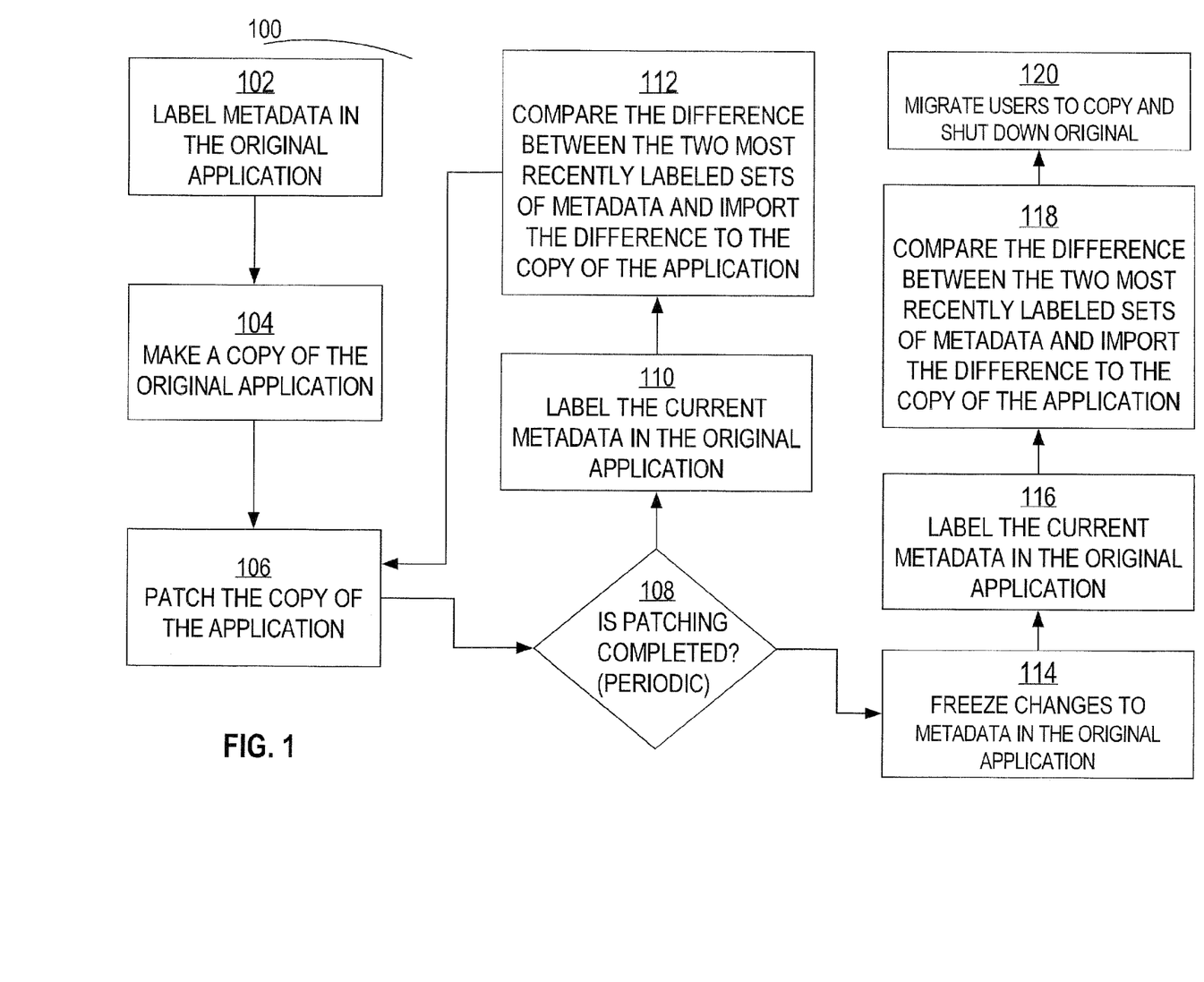
FIG. 1 is a flow diagram illustrating the steps in which one embodiment of the present invention may be implemented.

Process for Installing a Software Update with Minimal Time of Reduced Functionality for Application FIG. 1 is a flow diagram that illustrates an embodiment of a process for installing a software update to an application with minimal time of reduced functionality for the application. Steps in the process are described below with reference to blocks in FIG. 1.

Figure 2:
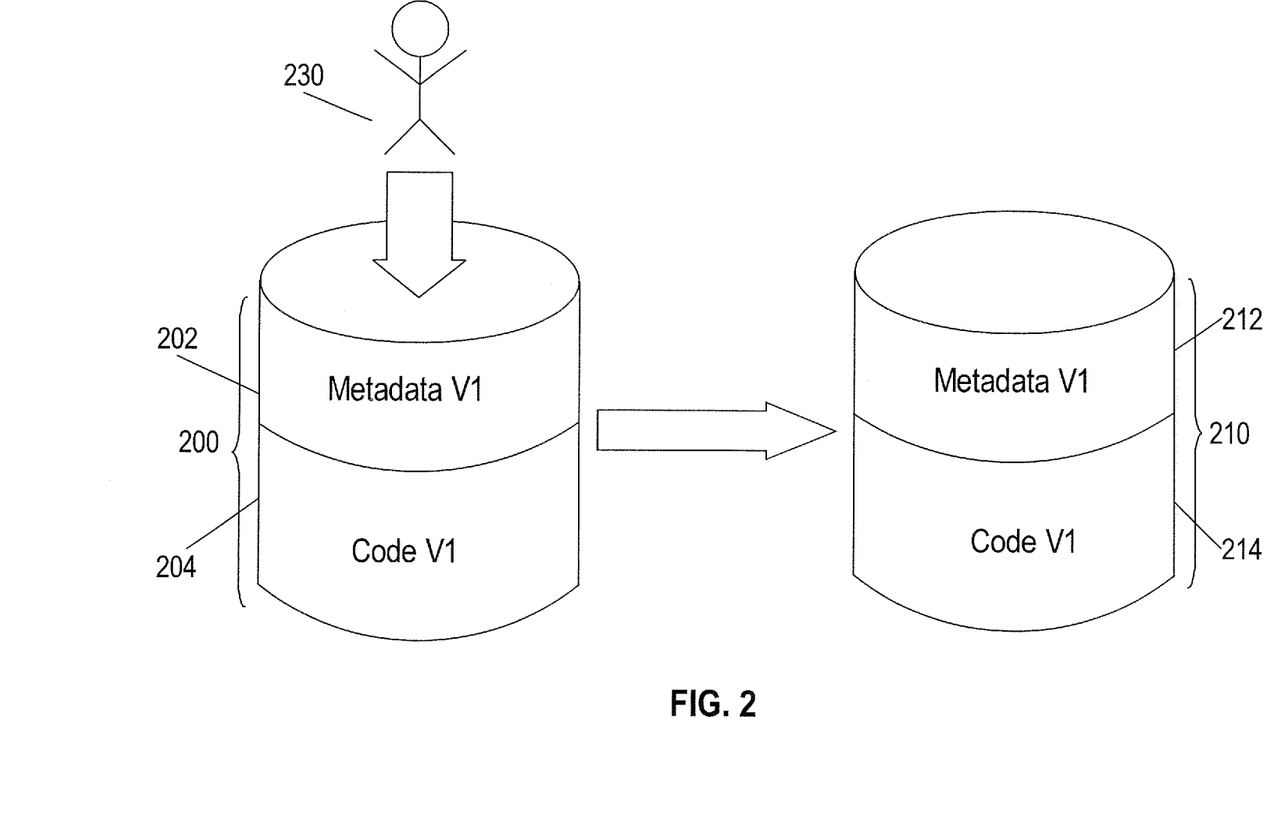
FIG. 2 depicts an example of an application and a copy of the application.

In Block 102 of flow diagram 100 in FIG. 1, the current set of metadata in the application is labeled. Labeling a set of metadata at a particular point in time stores the state of the metadata at that point in time. Next, the application to be updated, along with its metadata, is copied (Block 104). FIG. 2 illustrates these two operations. In FIG. 2, the application to be updated is application 200. From this point on, application 200 will also be referred to as the original application. Application 200 contains a set of code 204 for executing the application 200, and a set of metadata 202. Metadata 202 is labeled with the label "V1". Code 204 is labeled with the label "V1"

to indicate that this code has not yet been updated with the software update, or patch. A copy of application 200 is made, and this is application 210. Application 210 also contains code 214 and metadata 212. At this point, application 210 is exactly the same as application 200. Application 210 will also be referred to as the copy of the application.

Application 200 continues to run and continues to service users such as user 230. User 230 may interact with application 200 to complete transactions. For example, if application 200 is an application for submitting sales orders, then user 230 may interact with application 200 to submit new sales orders. Additionally, user 230 may also interact with application 200 to modify metadata 202. For example, the user 230 may modify metadata 202 to customize user interface elements such as menu bar colors and displayed font sizes.

Figure 3:
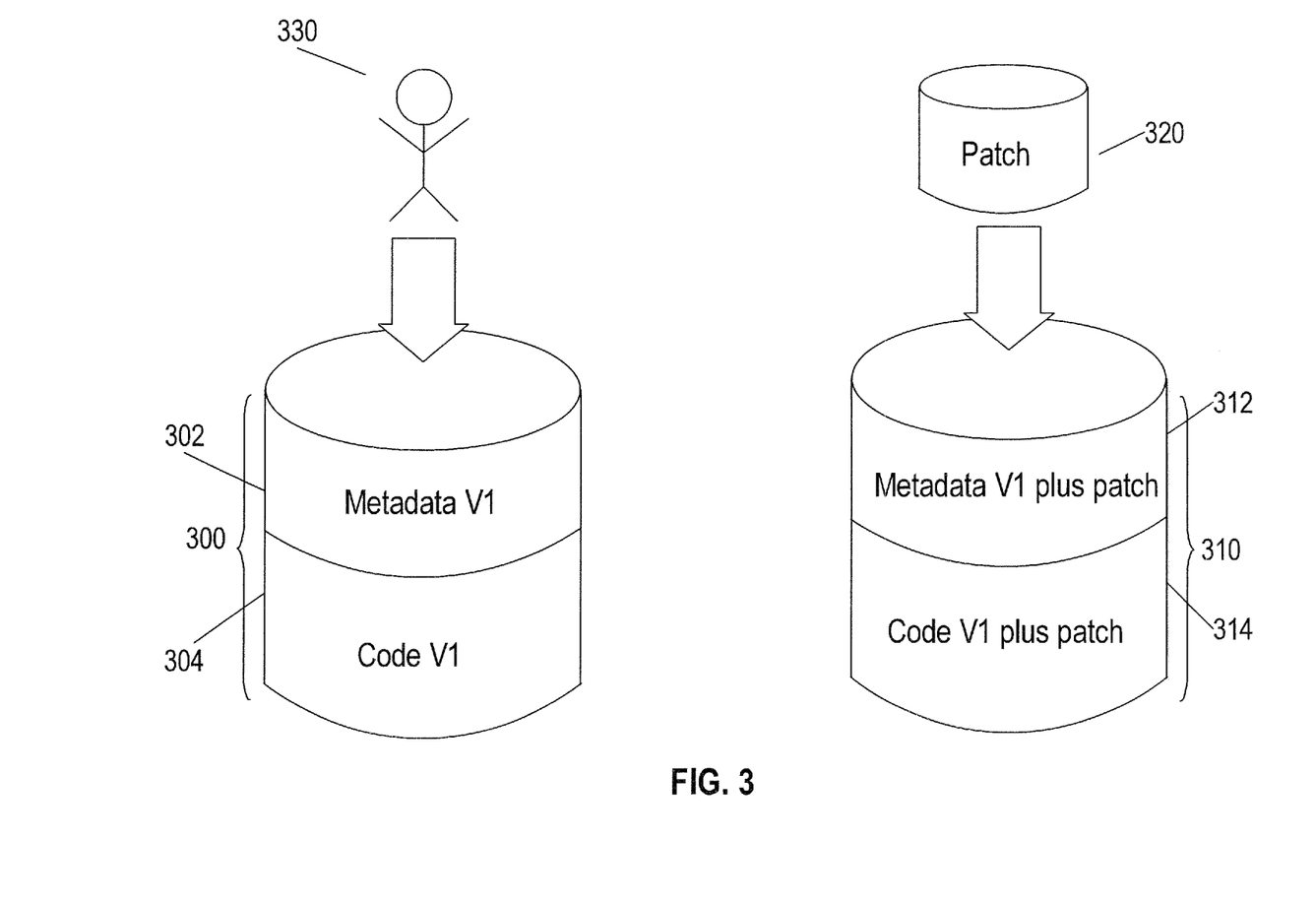
FIG. 3 depicts another example of an application and a copy of the application, where a software update is being installed on the copy of the application.

Once the copy of the original application has been made, installation of the software update may be initiated on the copy of the application (Block 106). FIG. 3 also illustrates this step. In FIG. 3, application 310 corresponds to application 210 in FIG. 2, and application 300 corresponds to application 200 in FIG. 2. Patch 320 is the software update being installed on application 310, which contains metadata 312 and code 314. At the same time, application 300, which contains metadata 302 and code 304, continues to be used by users such as user 330.

When an application is very large, software updates may take many hours, and sometimes many days, to complete. Therefore, the step performed in Block 106 may be ongoing for a long period of time. While Block 106 is ongoing, user 330 may be making many changes to the metadata 302. These changes result in divergent sets of metadata in the original application 300 and the copy of the application 310. At the end of the process, when the software update, or patch, has completed installation on the copy of the application 310, an additional amount of time is needed to update the metadata 312 in application 310 to reflect changes to the metadata 302. Therefore, according to a technique, to reduce the amount of metadata changes that must be applied to the copy of the application 310, metadata changes are periodically applied while the patch continues to be installed on the copy of the application 310.

In Block 108, a check is periodically performed to determine whether the software update to the copy of the application, or patching, has been completed. The frequency of this check can vary from one software update to another. If installation of the patch has not been completed, Blocks 110 and 112 are then performed to apply the most recent metadata changes in the original application to the copy of the application. While Blocks 110 and 112 are performed, Block 106 continues to be performed. That is, the patch continues to be installed on the copy of the application.

Figure 4:
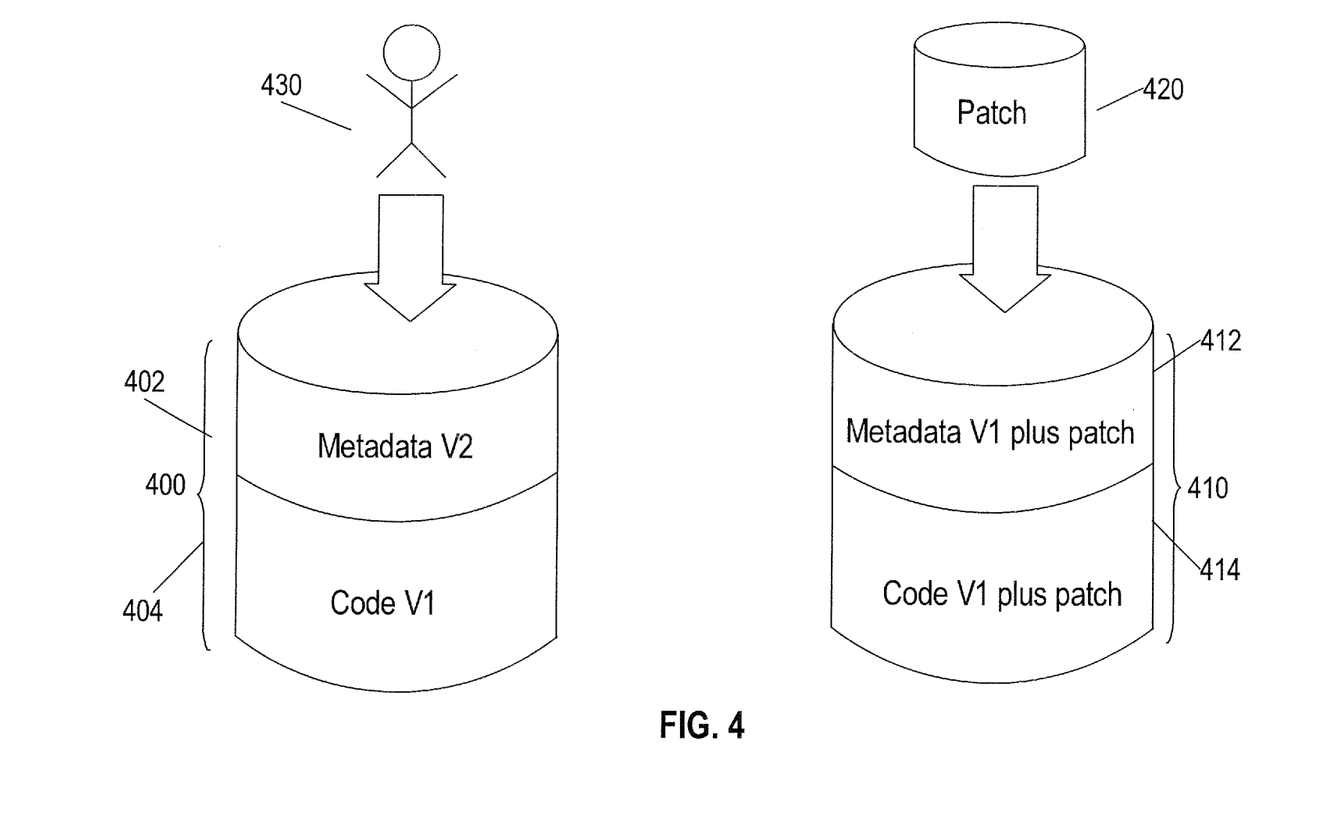
FIG. 4 depicts another example of an application and a copy of the application, where the metadata in the application and the metadata in the copy of the application have diverged.

In Block 110, the metadata in the original application is again labeled. FIG. 4 illustrates original application 400 and copy of the application 410 when Block 110 is performed. Application 400 contains metadata 402 and code 404. User 430 continues to use application 400 and continues to make modifications to metadata 402. However, when Block 110 is performed, the metadata at the time of performance is labeled as "V2". FIG. 4 also illustrates that at the same time, application 410 continues to be updated with patch 420. Application 410 contains metadata 412 and code 414. Metadata 412 is based on the metadata with the "V1" label. However, the software update may have modified metadata 412 in accordance with the updates. Code 414 has also been modified by the software update as a result of the application of patch 420.

Figure 5:
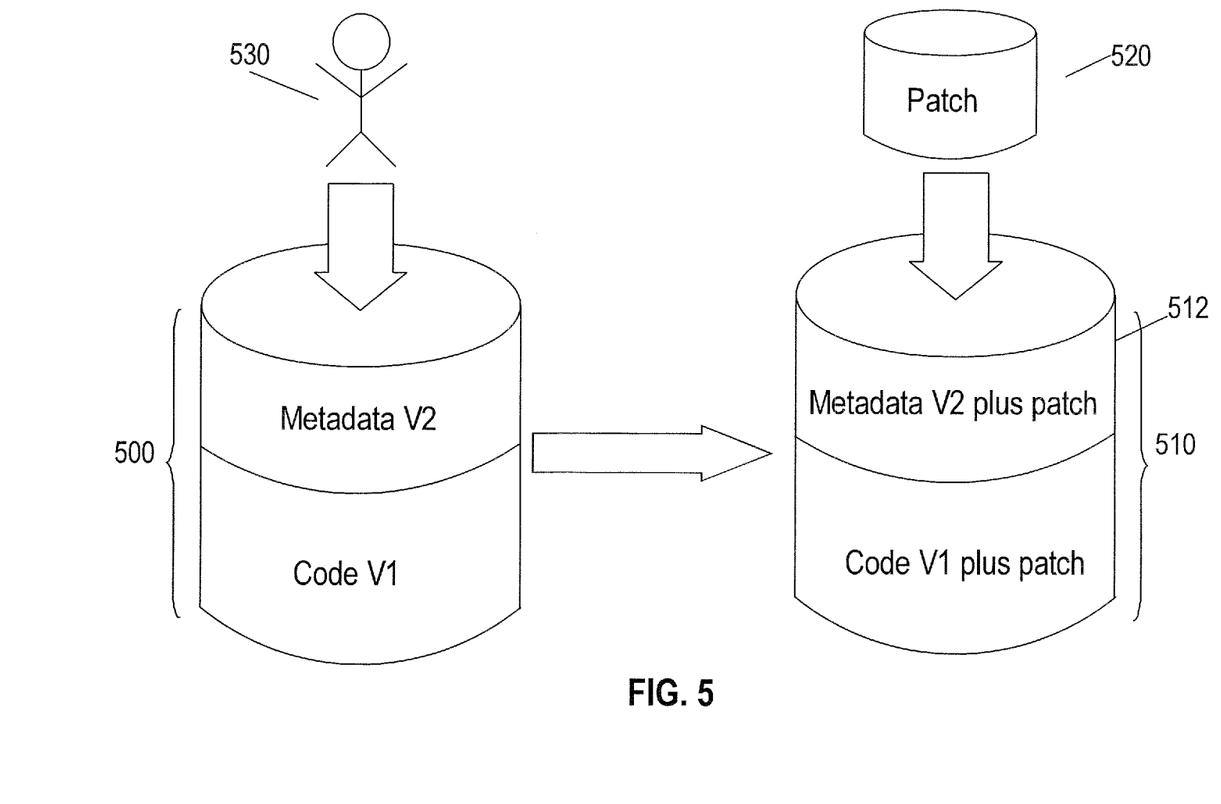
FIG. 5 depicts another example of an application and a copy of the application, where the metadata in the copy of the application is updated to incorporate changes to the metadata in the application.

In Block 112, the difference between metadata labeled "V1" and metadata labeled "V2" is determined. As discussed above, when a set of metadata is labeled, a "snapshot" of the metadata is taken. Therefore, although the metadata in the original application has been modified since the time the label "V1" was applied to the metadata, the set of metadata labeled "V1" can still be retrieved for comparison. In Block 112, metadata "V1" and metadata "V2" are compared and the difference between them determined. Once the difference is determined, this difference is imported to the metadata in the copy of the application. FIG. 5 illustrates this step. In FIG. 5, original application 500 continues to be used by users such as user 530. At the same time, copy of the application 510 continues to be updated with patch 520. In addition, the difference between metadata "V1" and metadata "V2" is also imported to the metadata of application 510, resulting in a set of metadata 512 that incorporates modifications made to the metadata in application 500 up to the time that the metadata is labeled "V2". Metadata 512 also incorporates relevant patch updates. According to a technique, if there are any conflicts between the modifications resulting from importing metadata differences and the patch updates, these conflicts are resolved automatically if logically possible. According to another technique, conflicts may also be resolved through human intervention. For example, an error message may be generated that requests a conflict resolution decision from a human such as a system administrator.

According to a technique, the steps in Blocks 110 and 112 are performed periodically and repeatedly until the patching of the copy of the application is completed. According to another technique, the steps in Blocks 110 and 112 are entirely skipped, and no updating of metadata is performed until after the patching of the copy of the application is completed.

Figure 6:
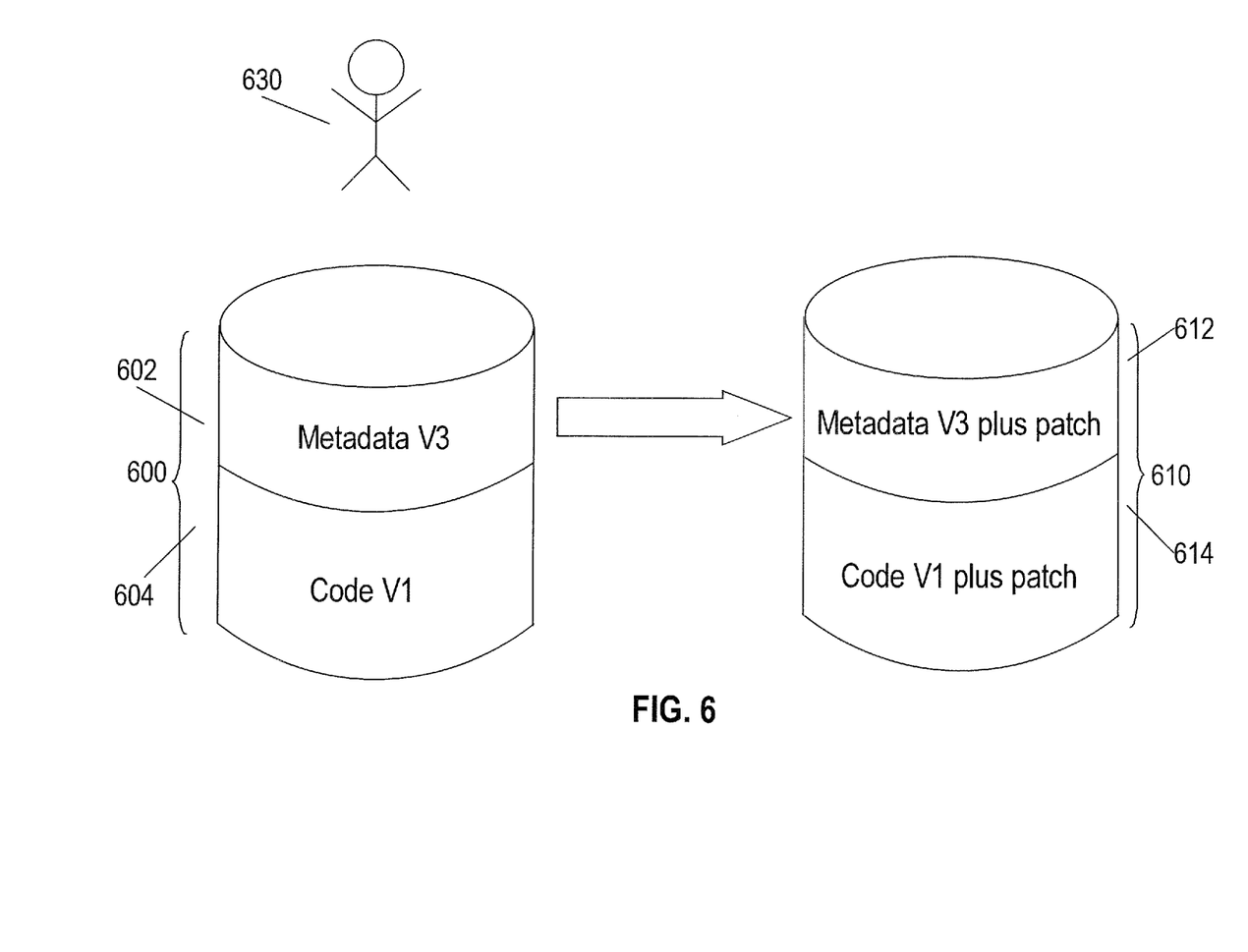
FIG. 6 depicts another example of an application and a copy of the application, where the software update to the application has been completed.

Once it is determined that the patching of the application is completed, Block 114 is performed. In Block 114, the original application discontinues the modification of metadata by users. As illustrated in FIG. 6, user 630 can no longer modify the metadata 602 of application 600. User 630, however, can continue to use application 600 to perform transactions such as submitting new sales orders. Therefore, after Block 114 is performed, application 600 remains available to users and is not completely shut down, although it no longer accepts user customizations that result in modifications to metadata 602.

Next, the most current version of the metadata 602 is labeled (Block 115). In FIG. 6, metadata 602 is labeled "V3". This is the final version of metadata 602 because users can no longer modify metadata 602. Although this final version of metadata 602 is labeled as "V3" in this example, this version number may be higher or lower depending on how many times Blocks 110 and 112 are performed.

Block 118 is similar to Block 112. In Block 118, the difference between the final version of the metadata 602 and the version of the metadata that has been applied to the copy of the application 610, is determined. Then, this difference is applied to metadata 612 of application 610 so that metadata 612 incorporates the final user modifications to the metadata 602. Similarly, metadata 612 also incorporates changes due to the software update, or patch, and any conflicts are resolved.

Figure 7:
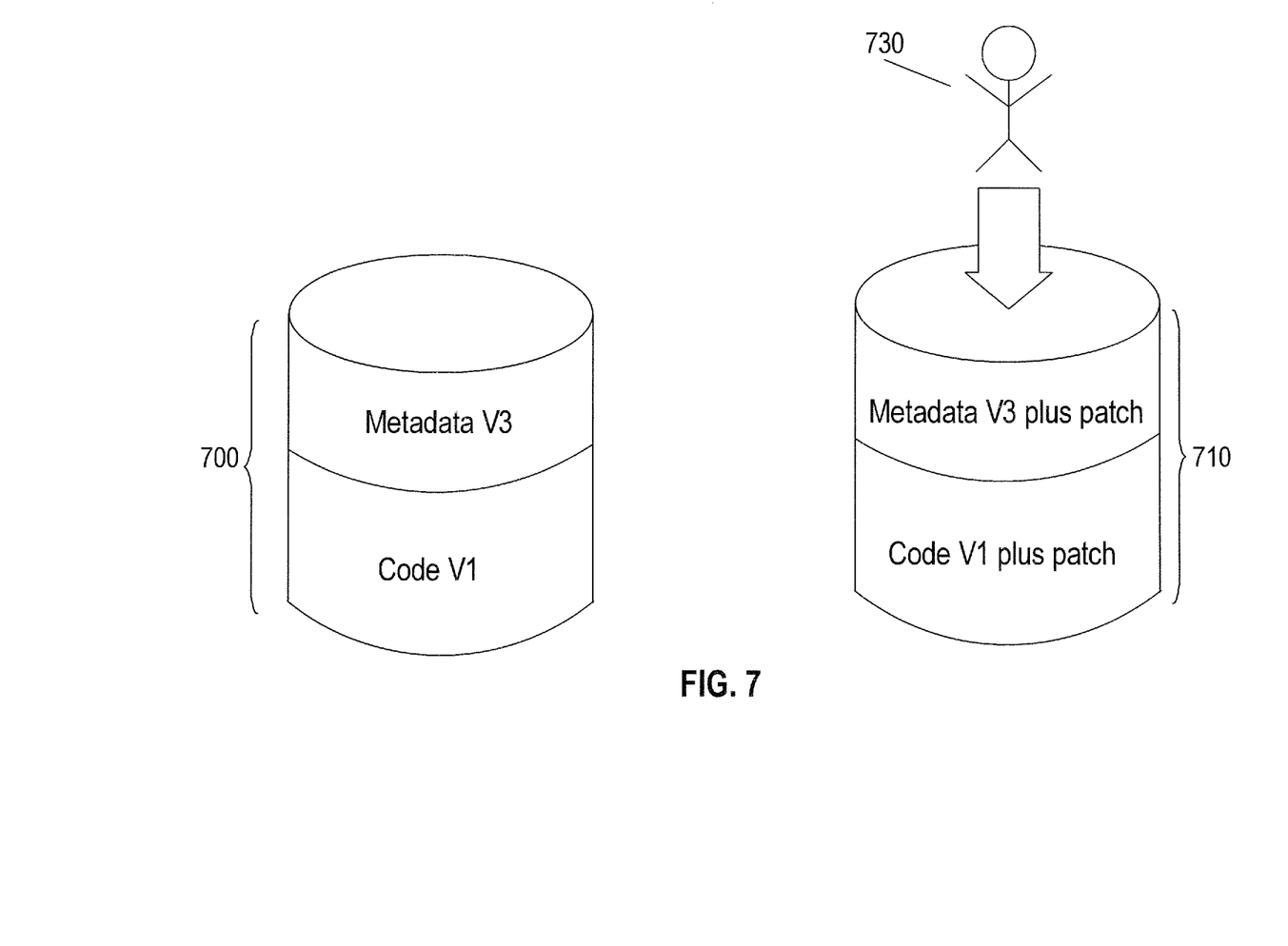
FIG. 7 depicts another example of an application and a copy of the application, where users of the application have been migrated to the copy of the application.

Finally, in Block 120, users of application 600 are migrated over to application 610. This is illustrated in FIG. 7. User 730 is now using application 710 and may start making modifications to the metadata again. Application 700 may now be shut down. The method just illustrated provides a way to install a software update on an application containing metadata without shutting down the application for the entire duration, thereby always providing users of the application access to the application. In addition, by creating a copy and periodically importing the metadata changes made by users to the original application to the patched application, the time during which users experienced a reduced functionality from not being able to make user customizations is also kept to a minimum.

In some cases, patching an application according to the method described may lengthen the amount of time it takes for the application to be patched. Therefore, for small patches where the expected downtime is less than a pre-configured threshold, the patch tool may shut down the application, either automatically or as a result of user direction, and apply the patch to the offline application.

Hardware Overview

Figure 8:
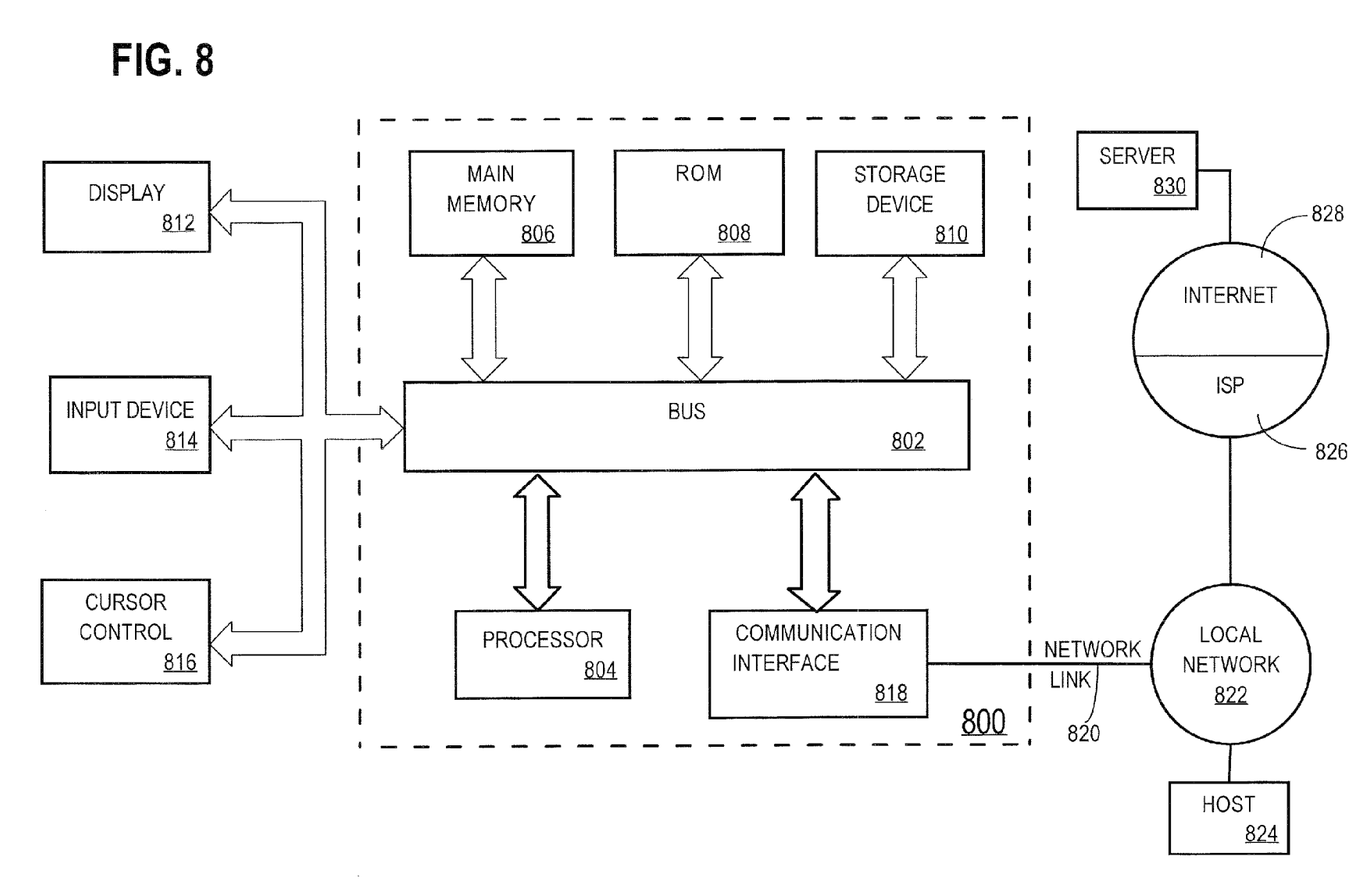
FIG. 8 depicts a computer system which may be used to implement an embodiment of the present invention.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to storage media and transmission media. Storage media includes both non-volatile media and volatile media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for updating an application that contains metadata, comprising the steps of:
    while running an original version of the application prior to running an updated version of the application, performing:
        labeling metadata in the original version of the application with a first version identifier;
        making a copy of the original version of the application;
            wherein the copy of the original version of the application contains the metadata as labeled with the first version identifier and as said metadata existed when the copy of the original version of the application was made;
        installing an update to the copy of the original version of the application to generate the updated version of the application, wherein installing the update includes modifying the metadata in the copy of the original version of the application while installing the update to the copy of the original version of the application,
        allowing one or more users to continue modifying the metadata in the original version of the application, and
        determining periodically whether installing the update to the updated version of the application has been completed, and in response to a determination that installing the update to the updated version of the application has not been completed, performing:
            labeling the metadata in the original version of the application with another version identifier;
            determining a first difference between the metadata labeled with the another version identifier in the original version of the application and metadata most recently labeled with a most recent another version identifier;
            updating the metadata in the updated version of the application to incorporate the first difference;
        after making the metadata in the original version of the application read-only, labeling the metadata in the original version of the application with a new version identifier;
        determining a second difference between the metadata labeled with the new version identifier and the metadata in the original version labeled with the most recent another version identifier;
        updating the metadata in the updated version of the application to incorporate the second difference.

2. The computer-implemented method of claim 1, further comprising:
    redirecting requests to the application to the updated version of the application; and
    shutting down the original version of the application.

3. The computer-implemented method of claim 1, wherein:
    updating the metadata in the updated version of the application to incorporate the first difference further comprises resolving conflicts between the metadata in the original version of the application and the metadata in the updated version of the application.

4. The computer-implemented method of claim 3, wherein:
    resolving conflicts between the metadata in the original version of the application and the metadata in the updated version of the application further comprises:
        displaying, to a user, an indication of a conflict; and
        receiving, from the user, instruction on how to resolve the conflict.

5. The computer-implemented method of claim 1, wherein at least one of the first difference or the second difference comprises information that is used to determine a behavior of code contained in the application.

6. The computer-implemented method of claim 1, wherein at least one of the first difference or the second difference comprises information that is used to configure a user interface of the application.

7. The computer-implemented method of claim 1, wherein:
    labeling the metadata in the original version of the application with a first version identifier comprises making a first copy of the metadata in the original version of the application at the time of labeling the metadata in the original version of the application with a first version identifier;
    wherein the first copy of the metadata is identified with the first version identifier;
    labeling the metadata in the original version of the application with a second version identifier comprises making a second copy of the metadata in the original version of the application at a time of labeling the metadata in the original version of the application with a second version identifier;
    wherein the second copy of the metadata is identified with the second version identifier;
    labeling the metadata in the original version of the application with a new version identifier comprises making a new copy of the metadata in the original version of the application at a time of labeling the metadata in the original version of the application with a new version identifier;
    wherein the new copy of the metadata is identified with the new version identifier.

8. A computer-implemented method for updating an application that contains metadata, comprising the steps of:
    while running an original version of the application prior to running an updated version of the application, performing:
        labeling metadata in the original version of the application with a first version identifier;
        making a copy of the original version of the application;
            wherein the copy of the original version of the application contains the metadata as labeled with the first version identifier and as said metadata existed when the copy of the original version of the application was made;

installing an update to the copy of the original version of the application to generate the updated version of the application, wherein installing the update includes modifying the metadata in the copy of the original version of the application;

while installing the update to the copy of the original version of the application, allowing one or more users to continue modifying the metadata in the original version of the application, and determining periodically whether installing the update to the updated version of the application has been completed, and in response to a determination that installing the update to the updated version of the application has not been completed, performing:

labeling the metadata in the original version of the application with another version identifier;

determining a first difference between the metadata labeled with the another version identifier in the original version of the application and metadata most recently labeled with a most recent another version identifier;

updating the metadata in the updated version of the application to incorporate the first difference.

9. The computer-implemented method of claim 8, further comprising:

redirecting requests to the application to the updated version of the application; and shutting down the original version of the application.

10. A non-transitory computer-readable storage medium storing instructions, wherein the instructions include instructions which, when executed by one or more processors, cause the one or more processors to perform steps of:

while running an original version of an application prior to running a updated version of the application, performing:

labeling metadata in the original version of the application with a first version identifier;

making a copy of the original version of the application;

wherein the copy of the original version of the application contains the metadata as labeled with the first version identifier and as said metadata existed when the copy of the original version of the application was made;

installing an update to the copy of the original version of the application to generate the updated version of the application, wherein installing the update includes modifying the metadata in the copy of the original version of the application;

while installing the update to the copy of the original version of the application, allowing one or more users to continue modifying the metadata in the original version of the application, and determining periodically whether installing the update to the updated version of the application has been completed, and in response to a determination that installing the update to the updated version of the application has not been completed, performing:

labeling the metadata in the original version of the application with another version identifier;

determining a first difference between the metadata labeled with the another version identifier in the original version of the application and metadata most recently labeled with a most recent another version identifier;

updating the metadata in the updated version of the application to incorporate the first difference;

after making the metadata in the original version of the application read-only, labeling the metadata in the original version of the application with a new version identifier;

determining a second difference between the metadata labeled with the new version identifier and the metadata in the original version labeled with the most recent another version identifier;

updating the metadata in the updated version of the application to incorporate the second difference.

11. The computer-readable medium of claim 10, wherein the instructions further comprise instructions for:

redirecting requests to the application to the updated version of the application; and shutting down the original version of the application.

12. The computer-readable medium of claim 10, wherein:

the instructions for updating the metadata in the updated version of the application to incorporate the first difference further comprises resolving conflicts between the metadata in the original version of the application and the metadata in the updated version of the application.

13. The computer-readable medium of claim 12, wherein:

the instructions for resolving conflicts between the metadata in the original version of the application and the metadata in the updated version of the application further comprises:

displaying, to a user, an indication of a conflict; and receiving, from the user, instruction on how to resolve the conflict.

14. The computer-implemented method of claim 10, wherein at least one of the first difference or the second difference comprises information that is used to determine a behavior of code contained in the application.

15. The computer-implemented method of claim 10, wherein at least one of the first difference or the second difference comprises information that is used to configure a user interface of the application.

16. The computer-readable medium of claim 10, wherein:

the instructions for labeling the metadata in the original version of the application with a first version identifier comprises making a first copy of the metadata in the original version of the application at the time of labeling the metadata in the original version of the application with a first version identifier;

wherein the first copy of the metadata is identified with the first version identifier;

the instructions for labeling the metadata in the original version of the application with a second version identifier comprises making a second copy of the metadata in the original version of the application at a time of labeling the metadata in the original version of the application with a second version identifier;

wherein the second copy of the metadata is identified with the second version identifier;

the instructions for labeling the metadata in the original version of the application with a new version identifier comprises making a new copy of the metadata in the original version of the application at a time of labeling the metadata in the original version of the application with a new version identifier;

wherein the new copy of the metadata is identified with the new version identifier.

17. A non-transitory computer-readable storage medium storing instructions, wherein the instructions include instructions which, when executed by one or more processors, cause the one or more processors to perform steps of:
  while running an original version of an application prior to running an updated version of the application, performing:
    labeling metadata in the original version of the application with a first version identifier;
    making a copy of the original version of the application;
      wherein the copy of the original version of the application contains the metadata as labeled with the first version identifier and as said metadata existed when the copy of the original version of the application was made;
    installing an update to the copy of the original version of the application to generate the updated version of the application, wherein installing the update includes modifying the metadata in the copy of the original version of the application;
    while installing the update to the copy of the original version of the application,
      allowing one or more users to continue modifying the metadata in the original version of the application, and
      determining periodically whether installing the update to the updated version of the application has been completed, and in response to a determination that installing the update to the updated version of the application has not been completed, performing:
        labeling the metadata in the original version of the application with another version identifier;
        determining a first difference between the metadata labeled with the another version identifier in the original version of the application and metadata most recently labeled with a most recent another version identifier;
        updating the metadata in the updated version of the application to incorporate the first difference.

18. The computer-readable storage medium of claim 17, wherein the instructions further comprise instructions for:
  redirecting requests to the application to the updated version of the application; and
  shutting down the original version of the application.

* * * * *

UNITED STATES PATENT AND TRADEMARK OFFICE
CERTIFICATE OF CORRECTION

PATENT NO.        : 8,589,909 B2                                              Page 1 of 1
APPLICATION NO.   : 11/972123
DATED             : November 19, 2013
INVENTOR(S)       : Hu et al.

It is certified that error appears in the above-identified patent and that said Letters Patent is hereby corrected as shown below:

In the Claims

In column 9, line 40, in Claim 10, delete "a" and insert -- an --, therefor.

In column 10, line 37, in Claim 14, delete "computer-implemented method" and insert -- computer–readable medium --, therefor.

In column 10, line 41, in Claim 15, delete "computer-implemented method" and insert -- computer–readable medium --, therefor.

Signed and Sealed this
Third Day of June, 2014

Michelle K. Lee
*Deputy Director of the United States Patent and Trademark Office*